Patented Apr. 6, 1948

2,439,192

UNITED STATES PATENT OFFICE 2,439,192

SILICOBORATE GLASS

Kuan-Han Sun and Thomas E. Callear, Rochester, N. Y., assignors to Eastman Kodak Company, Rochester, N. Y., a corporation of New Jersey No Drawing. Application August 9, 1946, Serial No. 689,531

1 Claim. (Cl. 106—54)

This invention relates to silico-borate glasses of relatively low melting point and of high resistivity against moisture attack. These glasses because of their clarity, colorlessness, and low melting point, are particularly useful as base glasses for color filters where the colorant is incorporated in the glass, particularly those containing volatile components as the colorant. Another advantage of the low melting glass is that it can be conveniently melted in crucibles of high silica glass and this eliminates the reaction of a colorant such as a sulfide or selenide with platinum, when the latter is used for the vessel.

In its simplest form the glasses consist of the oxides of beryllium, aluminum, silicon, boron and of an alkali (lithium, sodium or potassium). Lithium is perferred as the resulting glass is more durable against moisture attack.

In Table I are given seven examples of glass containing only the five oxides mentioned. In this table the weight and cationic percent of the several oxides are designated W and C respectively.

Table I

| Example | $LiO_{0.5}$ | | BeO | | $AlO_{1.5}$ | | $SiO_2$ | | $BO_{1.5}$ | |
|---|---|---|---|---|---|---|---|---|---|---|
| | W | C | W | C | W | C | W | C | W | C |
| 1 | 17.0 | 34 | 11.7 | 14 | 6.8 | 4 | 20.1 | 10 | 44.4 | 38 |
| 2 | 18.3 | 36 | 10.2 | 12 | 3.5 | 2 | 20.5 | 10 | 47.5 | 40 |
| 3 | 17.7 | 36 | 9.9 | 12 | 3.4 | 2 | 27.7 | 14 | 41.3 | 36 |
| 4 | 14.9 | 32 | 9.3 | 12 | 3.2 | 6 | 33.6 | 14 | 39.0 | 36 |
| 5 | 15.0 | 32 | 9.4 | 12 | 9.6 | 2 | 26.5 | 18 | 39.5 | 36 |
| 6 | 15.2 | 32 | 9.6 | 12 | 16.2 | 10 | 19.1 | 10 | 39.9 | 36 |
| 7 | 14.1 | 30 | 9.4 | 12 | 6.4 | 4 | 26.4 | 14 | 43.7 | 40 |
| Limits Weight percent | 8–18 | | 3–16 | | 25–23 | | 10–34 | | 21–45 | |
| Limits Cationic per cent | 27–38 | | 3–18 | | 2–10 | | 10–18 | | 30–40 | |

It is to be understood that other oxides may be added or substituted in part, but in any event the five oxides mentioned total over fifty percent, and preferably over eighty percent, by weight, and over eighty cationic percent and preferably over ninety cationic percent.

In the following table are given four examples including calcium oxide in addition to the five oxides already mentioned:

Table II

| Example | 8 | | 9 | | 10 | | 11 | |
|---|---|---|---|---|---|---|---|---|
| Oxide | W | C | W | C | W | C | W | C |
| Lithium | 15 | 33.2 | 16 | 32.6 | 16 | 32.3 | 15.3 | 32.0 |
| Beryllium | 3 | 3.9 | 12 | 14.6 | 12 | 14.4 | 11.2 | 14 |
| Calcium | 5 | 2.9 | 5 | 2.7 | 5 | 2.7 | 10.8 | 6 |
| Aluminum | 20 | 13.0 | 5 | 3.1 | 5 | 2.9 | 3.3 | 2 |
| Silicon | 18 | 9.9 | 20 | 10.2 | 23 | 11.5 | 19.2 | 10 |
| Boron | 39 | 37.1 | 42 | 36.8 | 39 | 36.2 | 40.2 | 36 |

In the following table are given four examples including zinc, strontium or cadmium oxide in addition to the five dominant components.

Table III

| Example | 12 | | 13 | | 14 | | 15 | |
|---|---|---|---|---|---|---|---|---|
| Oxide | W | C | W | C | W | C | W | C |
| Lithium | 14.6 | 32 | 14.0 | 32 | 16 | 32.7 | 13.4 | 32 |
| Beryllium | 10.7 | 14 | 10.3 | 14 | 12 | 14.6 | 9.9 | 14 |
| Zinc | 14.9 | 6 | | | | | | |
| Strontium | | | 18.3 | 6 | | | | |
| Cadmium | | | | | 5 | 1.2 | 21.7 | 6 |
| Aluminum | 3.1 | 2 | 3.0 | 2 | 5 | 3.0 | 2.8 | 2 |
| Silicon | 18.4 | 10 | 17.6 | 10 | 23 | 11.7 | 16.9 | 10 |
| Boron | 38.3 | 36 | 36.8 | 36 | 39 | 36.8 | 35.3 | 36 |

In the following table are given four examples in which barium or lead oxide is added to the five mentioned ingredients:

| Example | 16 | | 17 | | 18 | | 19 | |
|---|---|---|---|---|---|---|---|---|
| Oxide | W | C | W | C | W | C | W | C |
| Lithium | 10.7 | 29.9 | 8.4 | 27.8 | 15 | 33.7 | 10.7 | 30 |
| Beryllium | 7.8 | 13.1 | 6.1 | 12.2 | 11 | 14.8 | 8.4 | 14 |
| Barium | 34.2 | 9.4 | 48.3 | 15.7 | | | | |
| Lead | | | | | 15 | 2.3 | 32.0 | 6 |
| Aluminum | 3.4 | 2.8 | 2.7 | 2.6 | 5 | 3.3 | 3.7 | 3 |
| Silicon | 16.0 | 11.2 | 12.6 | 10.4 | 15 | 8.4 | 14.4 | 10 |
| Boron | 27.9 | 33.6 | 21.9 | 31.3 | 39 | 37.5 | 30.8 | 37 |

The following and last example includes small amounts of a large number of oxides in addition to the five principal ones:

| Oxide | Example 20 | |
|---|---|---|
| | W | C |
| Lithium | 14.2 | 32 |
| Beryllium | 10.4 | 14 |
| Calcium | 1.7 | 1 |
| Zinc | 2.4 | 1 |
| Strontium | 3.1 | 1 |
| Cadmium | 3.8 | 1 |
| Barium | 4.6 | 1 |
| Aluminum | 4.6 | 3 |
| Silicon | 17.9 | 10 |
| Boron | 37.3 | 36 |

The glassses having a high beryllium content are more durable than those with equivalent amounts of aluminum. Glasses having high barium content are relatively less durable than others.

In making the glasses herein described, the batch materials are thoroughly mixed in dry powdered form and fed into a platinum vessel inside a furnace. Those containing lead oxide as a component are more conveniently melted in a vessel of high silica glass. The batch melts to a clear liquid at about 1050° C. or below, the length of time depending on the amount and composition of the batch and may be from a quarter hour to several hours. The liquid is usually fairly fluid and may be shaken or stirred to uniformity. It is then poured into a mold previously heated to about 350–550° C. and cooled down slowly to room temperature. All the glasses are colorless.

It is understood that, as is usual in glass-making, the ingredients may be introduced in compounds other than the oxides, to which they are transformed in the furnace.

Since $Li_2O$, $Al_2O_3$, etc. are empirical formulas, it is equally expedient and more convenient, particularly in using cationic percentages, to adopt the form $BO_{1.5}$, $LaO_{1.5}$, etc.

Having described our invention, what we claim is:

A glass resulting from a batch containing: lithium oxide, 8 to 18 percent or 27 to 38 cationic percent; beryllium oxide, 3 to 16 weight percent or 3 to 18 cationic percent; aluminum oxide, 2.5 to 23 weight percent or 2 to 10 cationic percent; silicon oxide, 10 to 34 weight percent or 10 to 18 cationic percent; boron oxide, 21 to 45 weight percent or 30 to 40 cationic percent.

KUAN-HAN SUN.
THOMAS E. CALLEAR.

REFERENCES CITED

The following references are of record in the file of this patent:

UNITED STATES PATENTS

| Number | Name | Date |
|---|---|---|
| 1,964,321 | Hood | June 26, 1934 |

FOREIGN PATENTS

| Number | Country | Date |
|---|---|---|
| 477,698 | Great Britain | 1938 |